(12) United States Patent
Goeppert

(10) Patent No.: US 8,398,527 B2
(45) Date of Patent: Mar. 19, 2013

(54) METHOD FOR CONTROLLING A DUAL-CLUTCH TRANSMISSION

(75) Inventor: Georg Goeppert, Hausach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/463,621

(22) Filed: May 3, 2012

(65) Prior Publication Data

US 2012/0220423 A1    Aug. 30, 2012

Related U.S. Application Data

(63) Continuation of application No. PCT/DE2010/001050, filed on Sep. 6, 2010.

(30) Foreign Application Priority Data

Nov. 5, 2009   (DE) .......... 10 2009 052 067
Apr. 8, 2010   (DE) .......... 10 2010 014 193

(51) Int. Cl.
*F16H 61/40* (2010.01)
*B60W 10/00* (2006.01)
*B60W 10/02* (2006.01)
*B60W 10/04* (2006.01)

(52) U.S. Cl. ........... 477/180; 477/175; 477/80; 477/70; 477/68

(58) Field of Classification Search ........ 477/5–7, 477/15, 68, 70, 79, 80, 174, 175, 180; 74/330, 74/331
See application file for complete search history.

(56) References Cited

U.S. PATENT DOCUMENTS

| | | | |
|---|---|---|---|
| 4,470,494 A | 9/1984 | Takeuchi | |
| 6,536,296 B2 * | 3/2003 | Sakamoto et al. | 74/325 |
| 6,881,171 B2 * | 4/2005 | Kuhstrebe et al. | 477/78 |
| 7,314,427 B2 * | 1/2008 | Sakai et al. | 477/116 |
| 7,771,316 B2 * | 8/2010 | Honma et al. | 477/130 |
| 7,913,581 B2 * | 3/2011 | Jackson | 74/330 |
| 7,962,267 B2 * | 6/2011 | Honma et al. | 701/51 |
| 8,050,830 B2 * | 11/2011 | Komeda et al. | 701/51 |
| 2005/0228567 A1 * | 10/2005 | Mussaeus et al. | 701/55 |
| 2007/0191186 A1 | 8/2007 | Bothe et al. | |
| 2007/0220999 A1 * | 9/2007 | Hatori et al. | 74/330 |
| 2010/0024581 A1 * | 2/2010 | Ogami | 74/336 R |
| 2011/0010061 A1 * | 1/2011 | Seufert | 701/55 |
| 2011/0162483 A1 * | 7/2011 | Jackson | 74/665 A |
| 2011/0288703 A1 * | 11/2011 | Falkenstein et al. | 701/22 |

FOREIGN PATENT DOCUMENTS

| | | |
|---|---|---|
| DE | 3206068 | 9/1982 |
| GB | 2448671 | 10/2008 |
| JP | 2005344920 | 12/2005 |
| WO | 9531653 | 11/1995 |
| WO | 2009123108 | 10/2009 |

\* cited by examiner

*Primary Examiner* — Tisha Lewis
(74) *Attorney, Agent, or Firm* — Simpson & Simpson, PLLC

(57) ABSTRACT

A method of controlling a dual-clutch transmission in a motor vehicle, including two partial drivetrains, each having a plurality of gears, which each can be connected to a crankshaft of an internal combustion engine by a friction clutch, the method having the following steps: the first friction clutch transmits a torque to the first partial drivetrain assigned to it; the second friction clutch transmits at most a negligible torque to the second partial drivetrain; and the two partial drivetrains have a common differential, where when there are changes in torque and the amount of torque to be transmitted is low, and there is downshifting into a gear with a high transmission ratio in the first partial drivetrain, downshifting occurs into a gear with a low transmission ratio in the second partial drivetrain, and preliminary torque is applied to the differential by this gear.

9 Claims, 1 Drawing Sheet

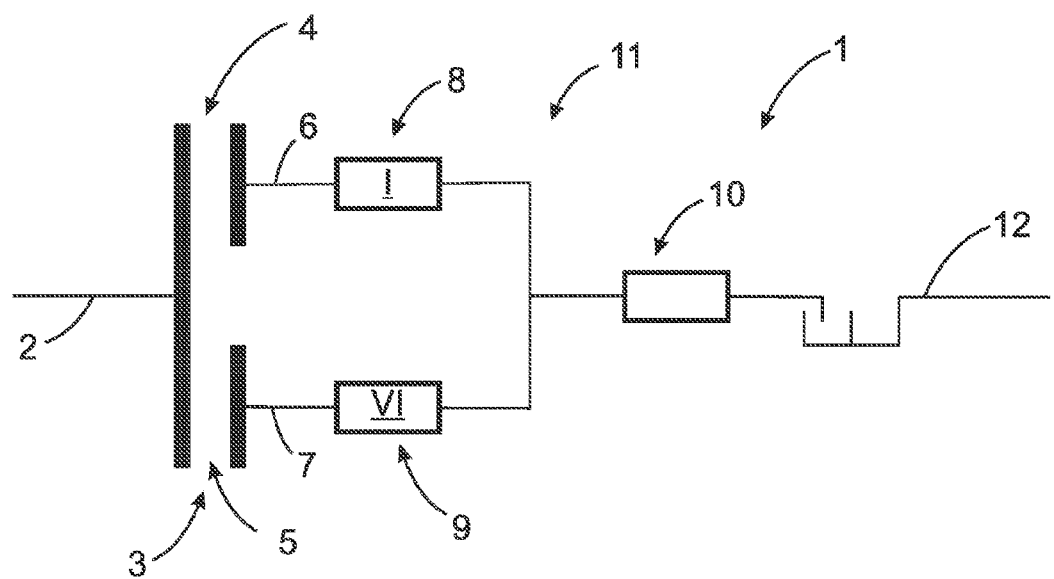

METHOD FOR CONTROLLING A DUAL-CLUTCH TRANSMISSION

CROSS-REFERENCE TO RELATED APPLICATIONS

This application is filed under 35 U.S.C. §120 and §365(c) as a continuation of International Patent Application No. PCT/DE2010/001050 filed Sep. 6, 2010, which application claims priority from German Patent Application No. 10 2009 052 067.8 filed Nov. 5, 2009, and German Patent Application No. 10 2010 014 193.3 filed Apr. 8, 2010, which applications are incorporated herein by reference in their entireties.

FIELD OF THE INVENTION

The invention relates to a method for controlling a dual-clutch transmission in a motor vehicle having two partial drivetrains, each having a plurality of gears, where each can be connected to a crankshaft of an internal combustion engine by means of a friction clutch, where the first friction clutch transmits a torque to the first partial drivetrain assigned to it, and the second friction clutch transmits at most a negligible torque to the second partial drivetrain, and the two partial drivetrains have a common differential.

BACKGROUND OF THE INVENTION

Dual-clutch transmissions are known from standard vehicles and have two partial drivetrains that are designed as separate partial transmissions with each having a plurality of gears. The partial drivetrains are each assigned a friction clutch that transmits an adjustable torque from a crankshaft of an internal combustion engine to the respective partial drivetrain. The methods for controlling the dual-clutch transmission control the friction clutches and the selection of the gears of the dual-clutch transmission such that a gear is engaged in a first, active partial drivetrain depending on the driving situation, and the motor vehicle is started. In the second, inactive partial drivetrain, a gear is preselected and engaged following the engaged gear in the corresponding driving situation. Shifting then occurs by overlapping the friction clutches by disengaging the active friction clutch and activating the disengaged friction clutch by simultaneously engaging it so that shifting can occur without interrupting the traction.

The partial drivetrains are joined at the output side in a differential that transmits the drive torque, for example, by means of side shafts, to the wheels of the motor vehicle. Play, such as the tooth play of the differential, gear wheel pairs, etc., exists in the partial drivetrains so that, when the torque transmitted via the active partial drivetrain quickly changes, for example from the startup processes, under a load change, etc., impacts can arise, such as load change impacts that affect driving comfort. It has been shown particularly with small gears that a large amount of torsion play arises when gears with a high transmission ratio are downshifted so that the friction clutch in a low gear, for example first gear, can forcefully torque the partial drivetrain, which causes a much stronger impact in the differential than when engaged gears with a lower transmission, such as sixth gear, are downshifted.

Thus, there is a long-felt need for a method of controlling a dual-clutch transmission with improved handling of the impact behavior of the active partial drivetrain.

BRIEF SUMMARY OF THE INVENTION

One object of the invention provides a method of controlling a dual-clutch transmission in a motor vehicle having two partial drivetrains, each having a plurality of gears, which each can be connected to a crankshaft of an internal combustion engine by means of a friction clutch, where the first friction clutch transmits a torque to the first partial drivetrain assigned to it, and the second friction clutch transmits at most a negligible torque to the second partial drivetrain, and the two partial drivetrains have a common differential and, when there are changes in torque and the amount of torque to be transmitted is low, and there is downshifting into a gear with a high transmission ratio in the first partial drivetrain, downshifting occurs into a gear with a low transmission ratio in the second partial drivetrain, and preliminary torque is applied to the differential by this gear.

The preliminary torque can be applied to the inactive partial drivetrain by engaging a large or high gear. The advantage is that, due to the lower transmission ratio of a high gear, the friction clutch has less torque play so that the impact torque remains low with the given play, for example, of the teeth of the differential. Furthermore, the preliminary torque can be gently applied before a change in torque, for example, while starting, and when the differential teeth lie on each other, the required amount of torque can be applied to the starting gear so that the motor vehicle can quickly start without impact from torque.

The preliminary torque can be applied by partially engaging the second friction clutch when a high gear is engaged. For example, a differential in a state of thrust can be disengaged in the direction of traction by applying, for example, just enough preliminary torque for the torque play to instigate a change from thrust mode to traction mode and for the tooth flanks of the differential to be applied in traction mode without the motor vehicle rolling or creeping more than desired. The risk of perceptible noise from impact or a jerk from torque is prevented merely by the lower transmission ratio of a higher gear.

In another embodiment, the preliminary torque can be at least partially applied by an electric machine actively connected to the second partial drivetrain. A conventional clutch that can be provided to connect to the electric machine with the inactive partial drivetrain can be at least partially engaged, and the electric machine can be correspondingly energized to supply the preliminary torque.

Only one quantity needs to be detected to perform the method when such a measure, such as engaging the inactive friction clutch and/or energizing the electric machine, is necessary, that is, when a jump or change in torque is anticipated. The specified level of preliminary torque to be applied can vary depending on the situation of the dual-clutch transmission torque without detecting the torque applied to the friction clutch or differential, which is difficult or impossible to detect, thus, allowing the preliminary torque to be easily controlled and applied.

Situations in which the motor vehicle is started have proven to be typical instances for the application of preliminary torque, especially when force is applied to the differential in the direction of thrust before starting torque is applied to the active partial drivetrain by a small gear. Such a state exists in particular when the direction of rotation of the torque changes in the differential, for example, while starting the motor vehicle after driving backwards on a flat road, or when starting on a slope. Furthermore, such states can arise for example, during stop-and-go traffic. If the motor vehicle is operated while coasting, that is, when the friction clutches are disengaged, impact from torque can arise when downshifting the friction clutch of the partial drivetrain to a gear with a high transmission ratio, that is, into first or second gear, when the differential in thrust mode experiences a reverse of torque. In one embodiment, in these situations, the friction clutch of the inactive partial drivetrain is engaged slightly with a high gear, such as sixth gear, before the friction clutch of the active partial drivetrain engages in the low gear, and the teeth of the differential are applied in the direction of traction, such that when the torque is transferred to the active partial drivetrain, the torque play of the teeth is already used up, thus, enabling the torque play of the differential to be applied comparatively noise-free due to the low torque play of the inactive friction clutch as a result of the lower transmission ratio of the higher gear. This has proven to be advantageous, preferably when the preliminary torque is applied while the speed of the transmission input shaft of the second, inactive partial drivetrain is less than the idling of the internal combustion engine when downshifting into a gear with a lower transmission ratio.

When an electric machine is used to provide the preliminary torque, impact from a load change such as the impact arising when starting the motor vehicle in reverse gear can be avoided by energizing the electrical machine in the opposite direction since this decreases the torque play in the differential that exists when driving in reverse. If a corresponding motor vehicle does not contain such an electric machine, entrainment torque can be applied to the friction clutch of the partial drivetrain with a reverse gear when reverse gear is engaged. The air play of the friction clutch can be reduced by the friction clutch design or by correspondingly controlling a clutch actuator so that a slight amount of torque is transmitted via the friction clutch of the partial drivetrain with the reverse gear that decreases the torsional play in the differential after the reverse gear is engaged.

BRIEF DESCRIPTION OF THE DRAWINGS

The nature and mode of operation of the present invention will now be more fully described in the following detailed description of the invention taken with the accompanying drawing figures, in which:

FIG. 1 is a schematic view of a drivetrain having a dual clutch transmission.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary, it is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 is a schematic view illustrating drivetrain 1 with crankshaft 2 of the internal combustion engine (not shown). Depending on the operating state of friction clutches 4, 5 combined into a dual-clutch 3, crankshaft 2 transmits torque to transmission input shafts 6, 7 of partial drivetrains 8, 9 that are combined in differential 10. From here, the torque introduced by crankshaft 2 into dual-clutch transmission 11 formed by dual drivetrain 8, 9 is transmitted to side shafts 12, of which only one is shown, to drive the wheels that are actively connected thereto.

Differential 10 has, for example, a torsional play of one degree that is amplified when a gear I is engaged in partial drivetrain 8 with high transmission ratio i(l) when downshifting. Assuming, for example, a transmission ratio of differential 10 of I(D)=4 and transmission ratio of gear I of i(l)=4, the torque play of differential 10 is amplified by a factor of 16. This means that one degree of torque play in differential 10 results in 16° of torque play in friction clutch 4, which causes an impact against the teeth of differential 10 when torque starts to be transmitted to transmission input shaft 6, especially given maximum torque play, since for example, the teeth flanks of the differential are previously in the thrust position. Consequently, when starting torque is applied to friction clutch 4, it can accelerate with this torque play almost unhindered, and the applied impact is correspondingly forceful. Starting is delayed when less starting torque is applied, and this is difficult to meter since the arising torque is insufficiently known or difficult to adjust.

To prevent such an impact, friction clutch 5 of partial drivetrain 9 is partially engaged when gear VI is engaged. Due to the lower transmission ratio when downshifting, for example I(VI)=0.5, the torsional play is only 2° while the transmission ratio of differential 10 remains the same. Consequently, the impact is much less even though the starting torque remains the same. Furthermore, the torque can be transmitted via partial drivetrain 9 briefly before the torque is transmitted via partial drivetrain 8 and can be less because, for example, friction clutches 4, 5 are actuated sequentially, and friction clutch 5 is engaged less so that the applied impact is exclusively compensated by partial drivetrain 9 and is practically no longer perceptible.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 Drivetrain
2 Crankshaft
3 Dual clutch
4 Friction clutch
5 Friction clutch
6 Transmission input shaft
7 Transmission input shaft
8 Partial drivetrain
9 Partial drivetrain
10 Differential
11 Dual-clutch transmission
12 Side shaft
I Gear
VI Gear

What is claimed is:

1. A method of controlling a dual-clutch transmission in a motor vehicle, including two partial drivetrains, each having a plurality of gears, which each can be connected to a crankshaft of an internal combustion engine by means of a friction clutch, the method comprising the following steps:

the first friction clutch transmits a first torque to the first partial drivetrain assigned to it;

the second friction clutch transmits a second torque to the second partial drivetrain; and, the two partial drivetrains have a common differential, wherein when there are changes in torque and the amount of torque to be transmitted is low, and there is downshifting into a gear with a high transmission ratio in the first partial drivetrain, downshifting occurs into a gear with a low transmission ratio in the second partial drivetrain, and a preliminary torque is applied to the differential by this gear.

2. The method as recited in claim 1, wherein the preliminary torque is expended by partially engaging the second friction clutch.

3. The method as recited in claim 1, wherein at least part of the preliminary torque is applied by an electric machine that is actively connected to the second partial drivetrain.

4. The method as recited in claim 1, wherein the preliminary torque is applied to the differential while the direction of rotation of the torque changes.

5. The method as recited in claim 1, wherein the preliminary torque is applied before or while the motor vehicle starts, especially during a start on a slope.

6. The method as recited in claim 1, wherein the preliminary torque is applied during clutch engagement after the motor vehicle has coasted.

7. The method as recited in claim 1, wherein the preliminary torque is applied when the speed of a transmission input shaft of the second partial drivetrain while downshifting into a gear with a lower transmission ratio is less than when the internal combustion engine is idling.

8. The method as recited in claim 1, wherein an entrainment torque is applied to the friction clutch of the partial drivetrain having a reverse gear when the reverse gear is engaged.

9. The method as recited in claim 1, wherein the first friction clutch of the first partial drivetrain has less air play than the second friction clutch.

* * * * *